United States Patent
Inokuchi et al.

(10) Patent No.: US 11,279,203 B2
(45) Date of Patent: Mar. 22, 2022

(54) AIR CONDITIONING CONTROL DEVICE

(71) Applicants: TOYOTA JIDOSHA KABUSHIKI KAISHA, Aichi-ken (JP); DENSO CORPORATION, Aichi-pref (JP)

(72) Inventors: Takaaki Inokuchi, Nagoya (JP); Asuka Marumo, Kariya (JP)

(73) Assignees: TOYOTA JIDOSHA KABUSHIKI KAISHA, Aichi-ken (JP); DENSO CORPORATION, Aichi-pref (JP)

( * ) Notice: Subject to any disclaimer, the term of this patent is extended or adjusted under 35 U.S.C. 154(b) by 196 days.

(21) Appl. No.: 16/807,164

(22) Filed: Mar. 3, 2020

(65) Prior Publication Data
US 2020/0282802 A1 Sep. 10, 2020

(30) Foreign Application Priority Data
Mar. 7, 2019 (JP) .............................. JP2019-041852

(51) Int. Cl.
*B60H 1/00* (2006.01)

(52) U.S. Cl.
CPC ..... *B60H 1/00735* (2013.01); *B60H 1/00964* (2013.01)

(58) Field of Classification Search
CPC .............. B60H 1/3232; B60H 1/00014; B60H 1/3208; B60H 1/3222; B60H 2001/3273
See application file for complete search history.

(56) References Cited

U.S. PATENT DOCUMENTS

| | | | | |
|---|---|---|---|---|
| 6,052,998 | A * | 4/2000 | Dage .................. | B60H 1/00735 62/178 |
| 6,532,926 | B1* | 3/2003 | Kuroda ............. | B60H 1/00778 123/179.4 |
| 2010/0304193 | A1* | 12/2010 | Karlsson ............. | H01M 10/625 429/50 |
| 2014/0095057 | A1* | 4/2014 | Takahashi ............. | F02D 41/042 701/112 |
| 2015/0283878 | A1* | 10/2015 | Rose ...................... | B60H 1/004 701/36 |
| 2019/0143837 | A1* | 5/2019 | Inagaki .................. | B60H 1/004 701/22 |

FOREIGN PATENT DOCUMENTS

| JP | 56128216 A | * 10/1981 | .......... B60H 1/3208 |
|---|---|---|---|
| JP | 2003-72352 A | 3/2003 | |
| JP | 2009-89474 A | 4/2009 | |

\* cited by examiner

*Primary Examiner* — Nelson J Nieves
(74) *Attorney, Agent, or Firm* — Hauptman Ham, LLP (57) ABSTRACT

An air conditioning control device senses a turning off of an ignition or a power supply of a vehicle, and stores a time of the turning off that is sensed at the vehicle, and stores a time of the turning off that is acquired by communication of a portable information terminal with the vehicle, and senses an advance setting command for pre-air-conditioning that operates an air conditioner of the vehicle, and determines absence or presence of the advance setting command, and, in a case in which it is determined that there is the advance setting command, instructs of execution of pre-air-conditioning control of the air conditioner on the basis of the time of the turning off that is sensed at the vehicle and the time of the turning off that is acquired by the communication of the portable information terminal with the vehicle.

9 Claims, 6 Drawing Sheets

AIR CONDITIONING CONTROL DEVICE

CROSS-REFERENCE TO RELATED APPLICATION

This application is based on and claims priority under 35 USC 119 from Japanese Patent Application No. 2019-041852 filed on Mar. 7, 2019, the disclosure of which is incorporated by reference herein.

BACKGROUND

Technical Field

The present disclosure relates to an air conditioning control device of a vehicle.

Related Art

The in-cabin environment of a vehicle is affected by sunlight and the outside air temperature, and becomes hot in the summer and cold in the winter. There are times when the heat or the cold within the cabin is marked to the extent that it is difficult to drive off immediately after getting into the vehicle. As a countermeasure thereto, vehicles have been developed that are equipped with a pre-air-conditioning function that operates the air conditioner of the vehicle in advance before passengers get into the vehicle.

Pre-air-conditioning is a structure in which a portable information terminal such as a smart phone or the like is operated such that the air conditioner of the vehicle can be turned on by remote operation from the vehicle exterior, and advance setting is carried out such that the air conditioner of the vehicle operates at a time instructed from the portable information terminal.

For example, Japanese Patent Application Laid-Open (JP-A) No. 2009-089474 discloses a timer setting device of an electric vehicle that makes it possible to easily carry out advance setting of pre-air-conditioning.

However, in the air conditioning control device that is disclosed in JP-A No. 2009-089474, if there is a time difference between the clock of the portable information terminal and the clock of the vehicle, a difference will arise between the time that the user sets in advance at the portable information terminal and the time at which it is desired to actually operate the air conditioner of the vehicle. As a result, there is the concern that the air conditioner will operate at a time that runs counter to the wishes of the user.

SUMMARY

The present disclosure provides an air conditioning control device that can prevent erroneous operation of an air conditioner in a case in which there is a time difference of a predetermined amount or more between the clock of a portable information terminal and the clock of a vehicle.

An air conditioning control device relating to an aspect of the present disclosure senses a turning off of an ignition or a power supply of a vehicle, and stores a time of the turning off that is sensed at the vehicle, and stores a time of the turning off that is acquired by the communication of a portable information terminal with the vehicle, and senses an advance setting command for pre-air-conditioning that operates an air conditioner of the vehicle, and determines absence or presence of the advance setting command, and, in a case in which it is determined that the advance setting command is present, instructs execution of pre-air-conditioning control of the air conditioner on the basis of the time of the turning off that is sensed at the vehicle and the time of the turning off that is acquired by the communication of the portable information terminal with the vehicle.

In accordance with the air conditioning control device relating to the aspect of the present disclosure, the suitability of operation of an air conditioner is determined on the basis of a time indicated by a clock of a portable information terminal and a time indicated by a clock of a vehicle.

As described above, in accordance with the present disclosure, by judging the suitability of operation of an air conditioner on the basis of a time indicated by a clock of a portable information terminal and a time indicated by a clock of a vehicle, the effect is achieved that erroneous operation of the air conditioner can be prevented in a case in which the clock of the portable information terminal and the clock of the vehicle are apart by a predetermined amount or more.

BRIEF DESCRIPTION OF THE DRAWINGS

An exemplary embodiment of the present invention will be described in detail based on the following figures, wherein.

DETAILED DESCRIPTION

Figure 1:
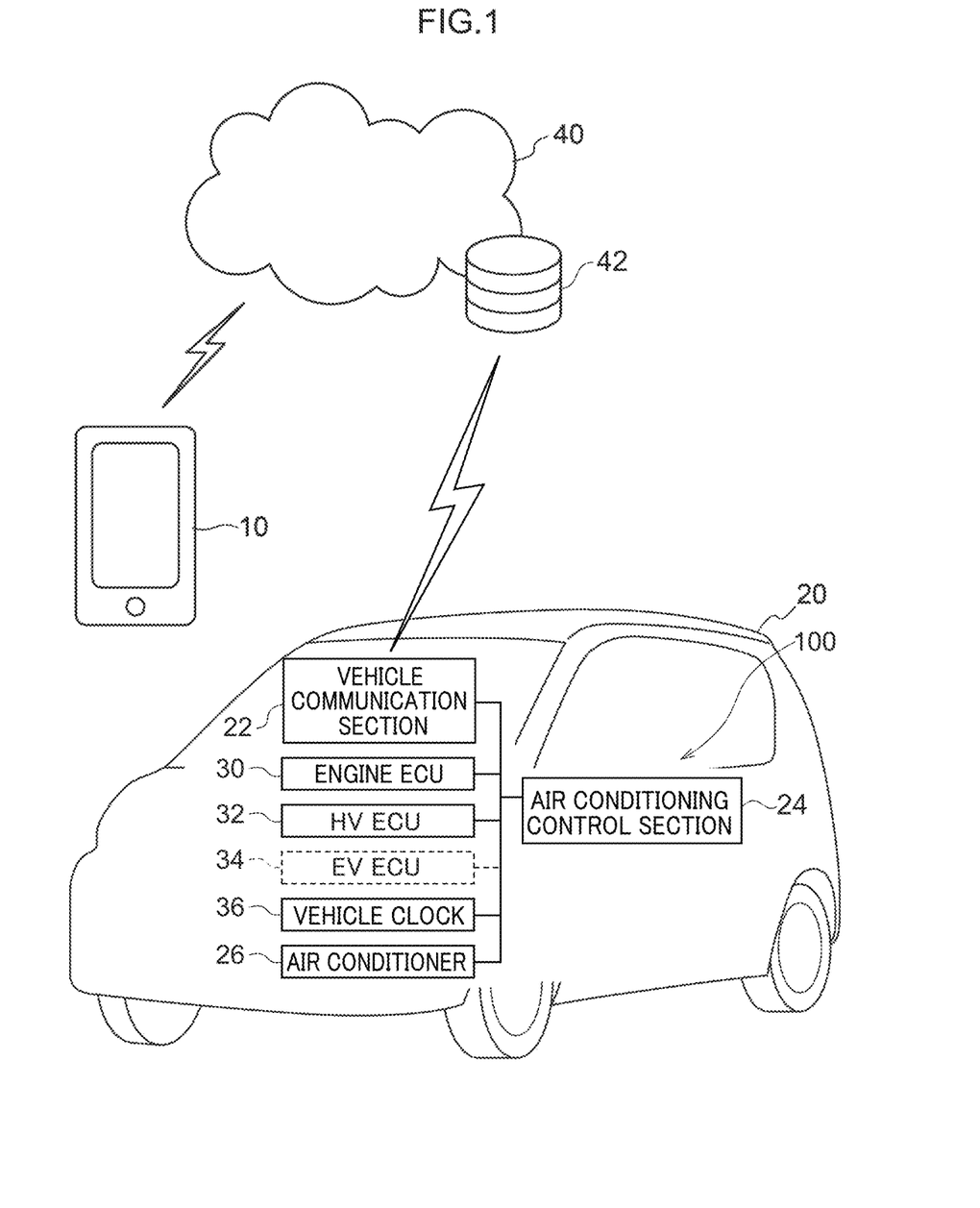
FIG. 1 is an explanatory drawing showing the relationship between an air conditioning control device relating to an embodiment of the present disclosure and other structures.

An exemplary embodiment of the present disclosure is described in detail hereinafter with reference to the drawings. FIG. 1 is an explanatory drawing showing the relationship between an air conditioning control device relating to the embodiment of the present disclosure, and other structures. As shown in FIG. 1, an air conditioning control device 100 relating to the present embodiment includes an air conditioning control section 24. A portable information terminal 10 such as a smart phone or the like can communicate wirelessly via a network 40 and a server 42. Further, a vehicle communication section 22 of a vehicle 20 can communicate wirelessly via the network 40 and the server 42.

The vehicle 20 has the air conditioning control section 24 that controls an air conditioner 26, an engine ECU 30, an HVECU 32, a vehicle clock 36, and, when needed, an EVECU 34. The air conditioning control section 24 is connected to the vehicle communication section 22 and the like. At the air conditioning control device 100 relating to the present embodiment, a user can set pre-air-conditioning in advance by using the portable information terminal 10 and by remote operation via the network 40 and the server 42. The air conditioning control section 24 sets pre-air-conditioning in advance in accordance with a pre-air-conditioning setting command that is received at the vehicle communication section 22, and controls the air conditioner 26 on the basis of this advance setting.

Figure 2:
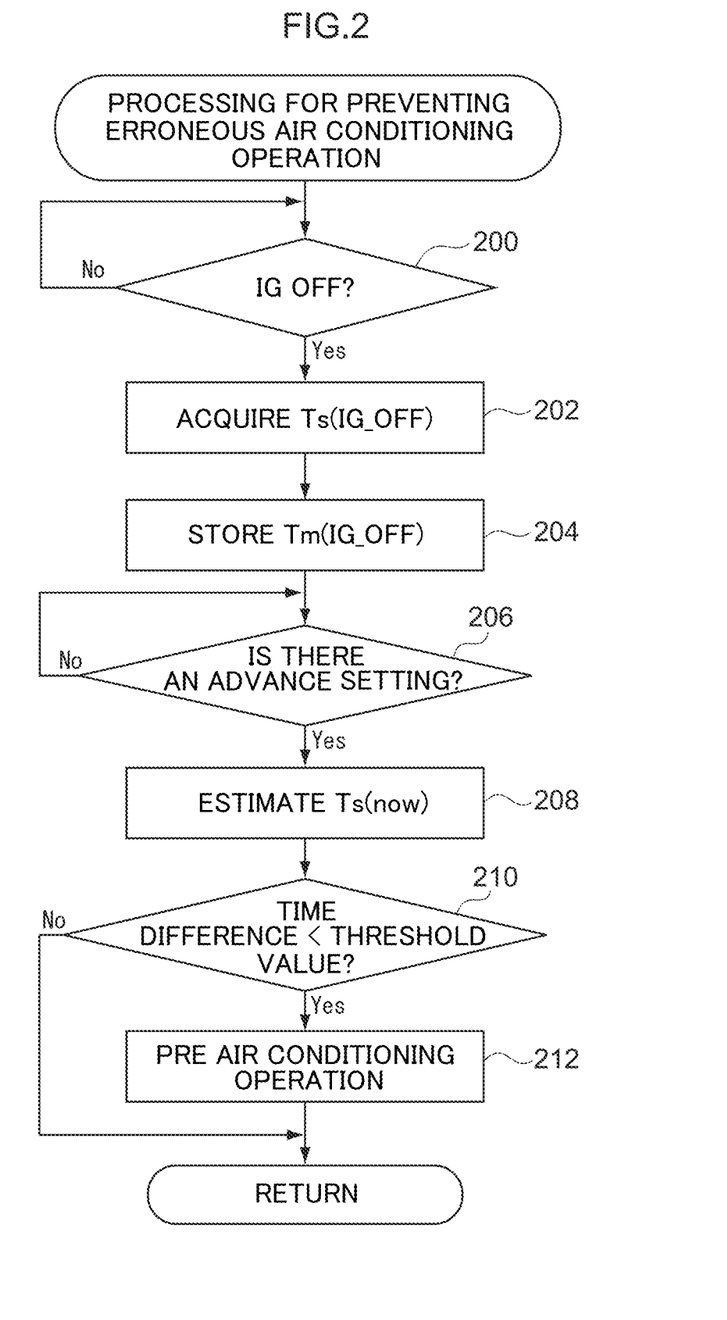
FIG. 2 is a flowchart showing an example of processing for preventing erroneous air conditioning operation of the air conditioning control device relating to the embodiment of the present disclosure.

FIG. 2 is a flowchart showing an example of processing for preventing erroneous air conditioning operation of the air conditioning control device 100 relating to the present embodiment. In the processing shown in FIG. 2, as an example, the portable information terminal 10 is the master that initiates the advance setting of pre-air-conditioning, and the air conditioning control section 24 of the vehicle 20 is the slave that is subordinate to the master. Further, the processing shown in FIG. 2 is controlled by an application of the portable information terminal 10 as an example.

In step 200, by the communication with the vehicle communication section 22 of the vehicle 20, it is determined whether or not the ignition of the vehicle 20 (the power supply in the case in which the vehicle 20 is an EV or the like) is off. In a case in which the ignition of the vehicle 20 is off in step 200, the routine moves on to step 202, and, in a case in which the ignition of the vehicle 20 is not off, the judgment of step 200 is continued.

In step 202, Ts(IG_OFF) that is the time indicated by the clock of the vehicle 20, which is the slave, at the time of the judgment of step 200 is acquired by the communication with the vehicle communication section 22 and is stored.

In step 204, Tm(IG_OFF) that is the time indicated by the clock of the portable information terminal 10, which is the master, at the time of the judgment of step 200 is stored.

In step 206, the absence/presence of a pre-air-conditioning advance setting is determined. In step 206, the absence/presence of a pre-air-conditioning advance setting may be determined by confirming the advance setting state of the air conditioning control section 24 of the vehicle 20 by the communication with the vehicle communication section 22 of the vehicle 20, or the absence/presence of a pre-air-conditioning advance setting may be determined from the communication history of the portable information terminal 10 with the vehicle communication section 22 of the vehicle 20.

In step 206, in a case in which there is an advance setting for pre-air-conditioning, the routine moves on to step 208, and, in a case in which there is no advance setting for pre-air-conditioning, the judgment of step 206 is continued.

In step 208, Ts(now) that is the estimated current time at the slave side is computed. Ts(now) is computed by the following formula. Tm(now) in the following formula is the time that is indicated by the clock of the portable information terminal 10 at the time when Ts(now) is computed in step 208.

$$Ts(\text{now}) = Ts(IG\_OFF) + (Tm(\text{now}) - Tm(IG\_OFF))$$

In step 210, it is determined whether or not the time difference between Tm(now) and Ts(now) is less than a threshold value. The threshold value is around 30 minutes to 2 hours as an example. If the time difference is less than the threshold value in step 210, in step 212, a command to operate the air conditioner 26 as per the pre-air-conditioning advance setting is transmitted to the vehicle communication section 22 of the vehicle 20, and the routine returns.

If the time difference is greater than or equal to the threshold value in step 210, the routine returns without transmitting a command to operate the air conditioner 26 to the vehicle communication section 22 of the vehicle 20, i.e., without operating the air conditioner 26.

As described above, in accordance with the air conditioning control device 100 relating to the present embodiment, in a case in which there is a time difference of a predetermined amount or greater between the clock of the portable information terminal and the clock of the vehicle, erroneous operation of the air conditioner can be prevented by not operating the air conditioner 26.

In a case in which there is a time difference of a predetermined amount or greater between the clock of the portable information terminal and the clock of the vehicle, although any of various reasons therefor can be contemplated, there may be, for example, a case in which the user who has the portable information terminal 10 is traveling outside of the country or the like. In such a case, the air conditioner 26 is not operated because it is not possible for the user to get in the vehicle 20 by the time when driving is planned at the pre-air-conditioning advance setting.

Further, the processing of above-described FIG. 2 is described as processing within the portable information terminal 10 that is the master, but the processing may be carried out at the air conditioning control section 24 that is the slave. A case in which the processing shown in FIG. 2 is carried out at the air conditioning control section 24 is as follows.

In step 200, by acquiring information from the ECU (not illustrated) for the engine (motor) of the vehicle 20, it is determined whether or not the ignition of the vehicle 20 is off. In a case in which the ignition of the vehicle 20 is off in step 200, the routine moves on to step 202, and, in a case in which the ignition of the vehicle 20 is not off, the judgment of step 200 is continued.

In step 202, Ts(IG_OFF) that is the time indicated by the clock of the vehicle 20, which is the slave, at the time of the judgment of step 200 is stored.

In step 204, Tm(IG_OFF) that is the time indicated by the clock of the portable information terminal 10, which is the master, at the time of the judgment of step 200 is acquired by the communication with the portable information terminal 10 via the vehicle communication section 22, the network 40 and the server 42, and is stored.

In step 206, in a case in which there is an advance setting for pre-air-conditioning, the routine moves on to step 208, and, in a case in which there is no advance setting for pre-air-conditioning, the judgment of step 206 is continued.

In step 208, Tm(now) that is the estimated current time at the master side is computed. Tm(now) is computed by the following formula. Ts(now) in the following formula is the time that is indicated by the clock of the vehicle 20, which is the slave side, at the time when Tm(now) is computed in step 208.

$$Tm(\text{now}) = Tm(IG\_OFF) + (Ts(\text{now}) - Ts(IG\_OFF))$$

In step 210, it is determined whether or not the time difference between Tm(now) and Ts(now) is less than a threshold value. The threshold value is around 30 minutes to 2 hours as described above. If the time difference is less than the threshold value in step 210, in step 212, the air conditioner 26 is operated as per the pre-air-conditioning advance setting, and the routine returns.

If the time difference is greater than or equal to the threshold value in step 210, the routine returns without operating the air conditioner 26.

In accordance with the above-described processes, the on/off of the ignition of the vehicle 20 and the absence/presence of an advance setting for pre-air-conditioning can be confirmed without relying on communication via the network 40. Therefore, processing for preventing erroneous air conditioning operation can be executed more simply and rapidly than by the above-described control by an application of the portable information terminal 10.

Figure 3:
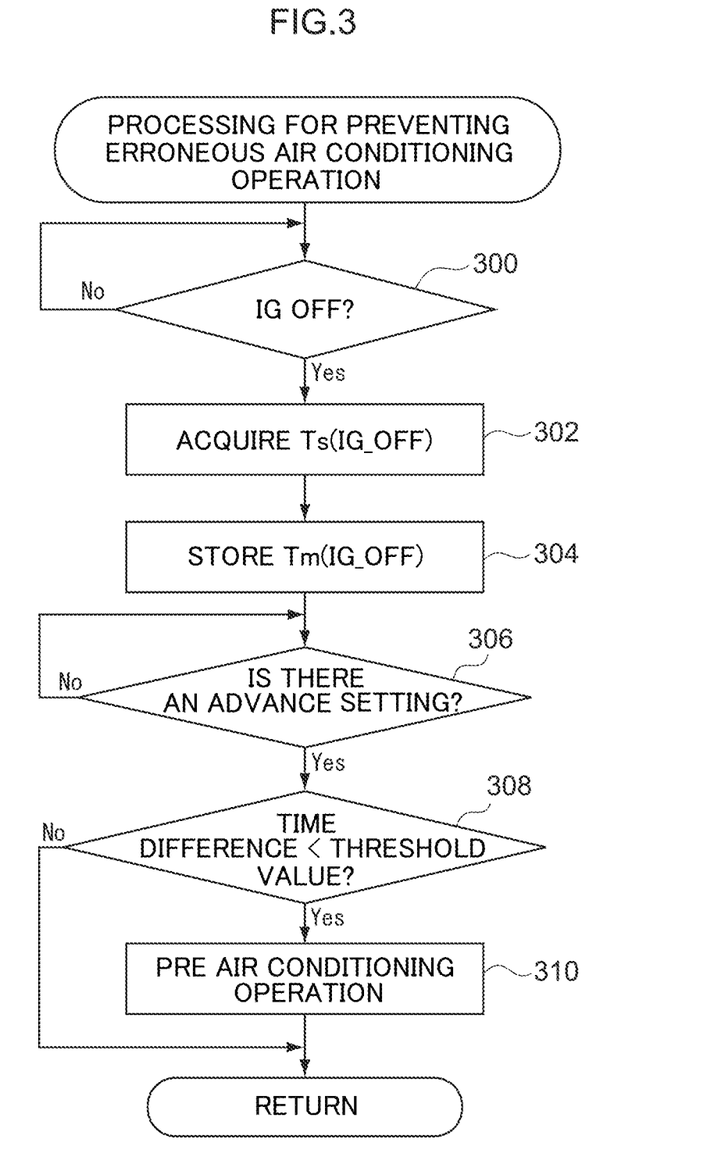
FIG. 3 is a flowchart showing a modified example of the processing for preventing erroneous air conditioning operation of the air conditioning control device relating to the embodiment of the present disclosure.

A modified example of the present embodiment is described next. FIG. 3 is a flowchart showing a modified example of the processing for preventing erroneous air conditioning operation of the air conditioning control device 100 relating to the present embodiment. Because the processes of steps 300 through 306 of FIG. 3 are similar to the processes of steps 200 through 206 of FIG. 2 that are carried out by an application of the portable information terminal 10, detailed description thereof is omitted.

The processing shown in FIG. 3 differs from the processing shown in FIG. 2 with regard to the point that the necessity of operating the air conditioner 26 is determined on the basis of the time difference between Tm(IG_OFF) and Ts(IG_OFF), without estimating Ts(now).

In step 308, it is determined whether or not the time difference between Tm(IG_OFF) and Ts(IG_OFF) is less than a threshold value. The threshold value is around 30 minutes to 2 hours, as described above. If the time difference is less than the threshold value in step 308, in step 310, a command to operate the air conditioner 26 as per the pre-air-conditioning advance setting is transmitted to the vehicle communication section 22 of the vehicle 20, and the routine returns.

If the time difference is greater than or equal to the threshold value in step 308, the routine returns without transmitting a command to operate the air conditioner 26 to the vehicle communication section 22 of the vehicle 20, i.e., without operating the air conditioner 26.

As described above, in accordance with the air conditioning control device 100 relating to the present embodiment, in a case in which there is a time difference of a predetermined amount or greater between Tm(IG_OFF) that is indicated by the clock of the portable information terminal 10 and Ts(IG_OFF) that is indicated by the clock of the vehicle 20, erroneous operation of the air conditioner can be prevented by not operating the air conditioner 26.

In the processing shown in FIG. 3, the current time at the slave side is not estimated as is the case in FIG. 2, and therefore, the processing for preventing erroneous air conditioning operation can be executed more simply and rapidly.

Further, the processing of above-described FIG. 3 is described as processing within the portable information terminal 10 that is the master, but the processing may be carried out at the air conditioning control section 24 that is the slave. A case in which the processing shown in FIG. 3 is carried out at the air conditioning control section 24 is as follows.

In step 300, by acquiring information from the ECU for the engine (motor) of the vehicle 20, it is determined whether or not the ignition of the vehicle 20 is off. In a case in which the ignition of the vehicle 20 is off in step 300, the routine moves on to step 302, and, in a case in which the ignition of the vehicle 20 is not off, the judgment of step 300 is continued.

In step 302, Ts(IG_OFF) that is the time indicated by the clock of the vehicle 20, which is the slave, at the time of the judgment of step 300 is stored.

In step 304, Tm(IG_OFF) that is the time indicated by the clock of the portable information terminal 10, which is the master, at the time of the judgment of step 300 is acquired by the communication with the portable information terminal 10 via the vehicle communication section 22, the network 40 and the server 42, and is stored.

In step 306, in a case in which there is an advance setting for pre-air-conditioning, the routine moves on to step 308, and, in a case in which there is no advance setting for pre-air-conditioning, the judgment of step 306 is continued.

In step 308, it is determined whether or not the time difference between Tm(IG_OFF) and Ts(IG_OFF) is less than a threshold value. The threshold value is around 30 minutes to 2 hours, as described above. If the time difference is less than the threshold value in step 308, in step 310, the air conditioner 26 is operated as per the pre-air-conditioning advance setting, and the routine returns.

If the time difference is greater than or equal to the threshold value in step 308, the routine returns without operating the air conditioner 26.

In accordance with the above-described processes, the on/off of the ignition of the vehicle 20 and the absence/presence of an advance setting for pre-air-conditioning can be confirmed without relying on communication via the network 40. Therefore, the processing for preventing erroneous air conditioning operation can be executed more simply and rapidly than by the above-described control by an application of the portable information terminal 10.

Figure 4:
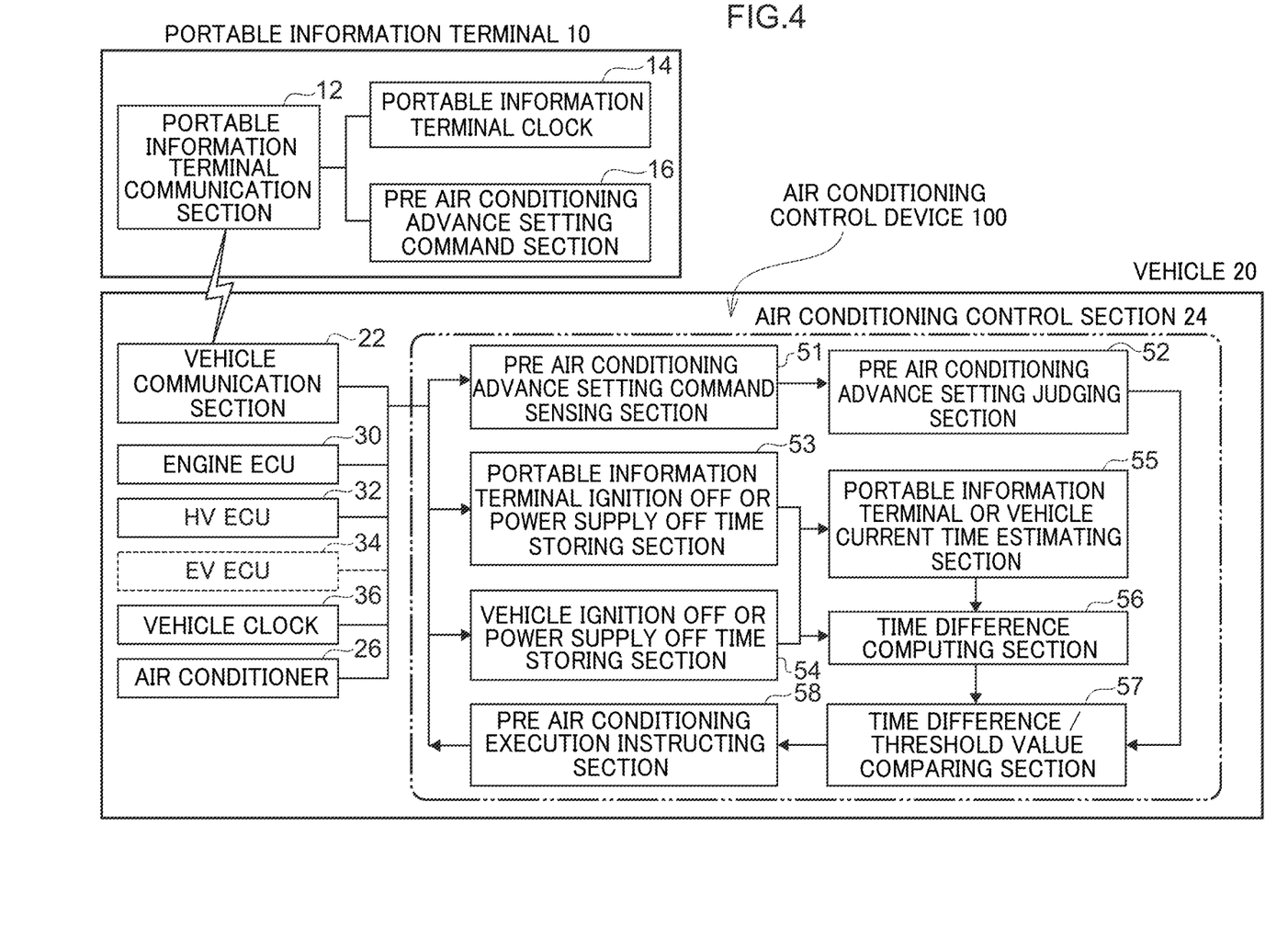
FIG. 4 is a block drawing showing the schematic structure of the air conditioning control device relating to the embodiment of the present disclosure.

FIG. 4 is a block drawing showing the schematic structure of the air conditioning control device relating to the embodiment of the present disclosure. The portable information terminal 10 has a portable information terminal communication section 12, a portable information terminal clock 14, and a pre-air-conditioning advance setting command section 16. The portable information terminal communication section 12 transmits, to the vehicle communication section 22, a time of the portable information terminal 10 that is measured by the portable information terminal clock 14, e.g., the ignition off or power supply off time of the vehicle 20 that is acquired by the communication with the vehicle communication section 22. Further, the portable information terminal communication section 12 transmits, to the vehicle communication section 22, a pre-air-conditioning advance setting command from the pre-air-conditioning advance setting command section 16.

The vehicle communication section 22 acquires the ignition off or power supply off time of the vehicle 20 that was grasped by the portable information terminal 10, and a portable information terminal ignition off or power supply off time storing section 53 stores that time. Further, the vehicle communication section 22 acquires the pre-air-conditioning advance setting command, and transmits it to a pre-air-conditioning advance setting command sensing section 51.

The pre-air-conditioning advance setting command sensing section 51 senses the pre-air-conditioning advance setting command. A pre-air-conditioning advance setting judging section 52 receives the results of sensing relating to the pre-air-conditioning advance setting command of the pre-air-conditioning advance setting command sensing section 51, and determines whether or not there is a pre-air-conditioning advance setting.

Via a bus communication line or the like of the vehicle for example, a vehicle ignition off or power supply off time storing section 54 stores the ignition off or power supply off time of the engine ECU 30 or the HVECU 32 that was measured by the vehicle clock 36.

A portable information terminal or vehicle current time estimating section 55 estimates the current time of one of the portable information terminal 10 and the vehicle 20 in accordance with the above computational formulas, from the portable information terminal ignition off or power supply off time that is stored in the portable information terminal ignition off or power supply off time storing section 53, and the vehicle ignition off or power supply off time that is stored in the vehicle ignition off or power supply off time storing section 54.

In a case in which it is determined by the pre-air-conditioning advance setting judging section 52 that there is a pre-air-conditioning advance setting, a time difference computing section 56 computes the time difference between the current time of the one of the portable information terminal 10 or the vehicle 20 that was estimated by the portable information terminal or vehicle current time estimating section 55, and the current time of the another that was computed by the portable information terminal ignition off or power supply off time storing section 53 and the vehicle ignition off or power supply off time storing section 54.

A time difference/threshold value comparing section 57 compares the time difference that was computed by the time difference computing section 56 and a predetermined threshold value, and determines whether or not the time difference computed by the time difference computing section 56 is less than the predetermined threshold value. The threshold value is, as an example, around 30 minutes to 2 hours. In a case in which the results of comparison by the time difference/threshold value comparing section 57 are that the time difference computed by the time difference computing section 56 is less than the predetermined threshold value, a pre-air-conditioning execution instructing section 58 instructs the air conditioner 26 to execute pre-air-conditioning as per the pre-air-conditioning advance setting.

In a case in which the results of comparison by the time difference/threshold value comparing section 57 are that the time difference computed by the time difference computing section 56 is greater than or equal to the predetermined threshold value, the pre-air-conditioning execution instructing section 58 does not instruct the air conditioner to execute pre-air-conditioning.

Although FIG. 4 illustrates an embodiment in which the vehicle 20 includes the air conditioning control section 24, there may be an embodiment in which the portable information terminal 10 includes the air conditioning control section 24.

Figure 5:
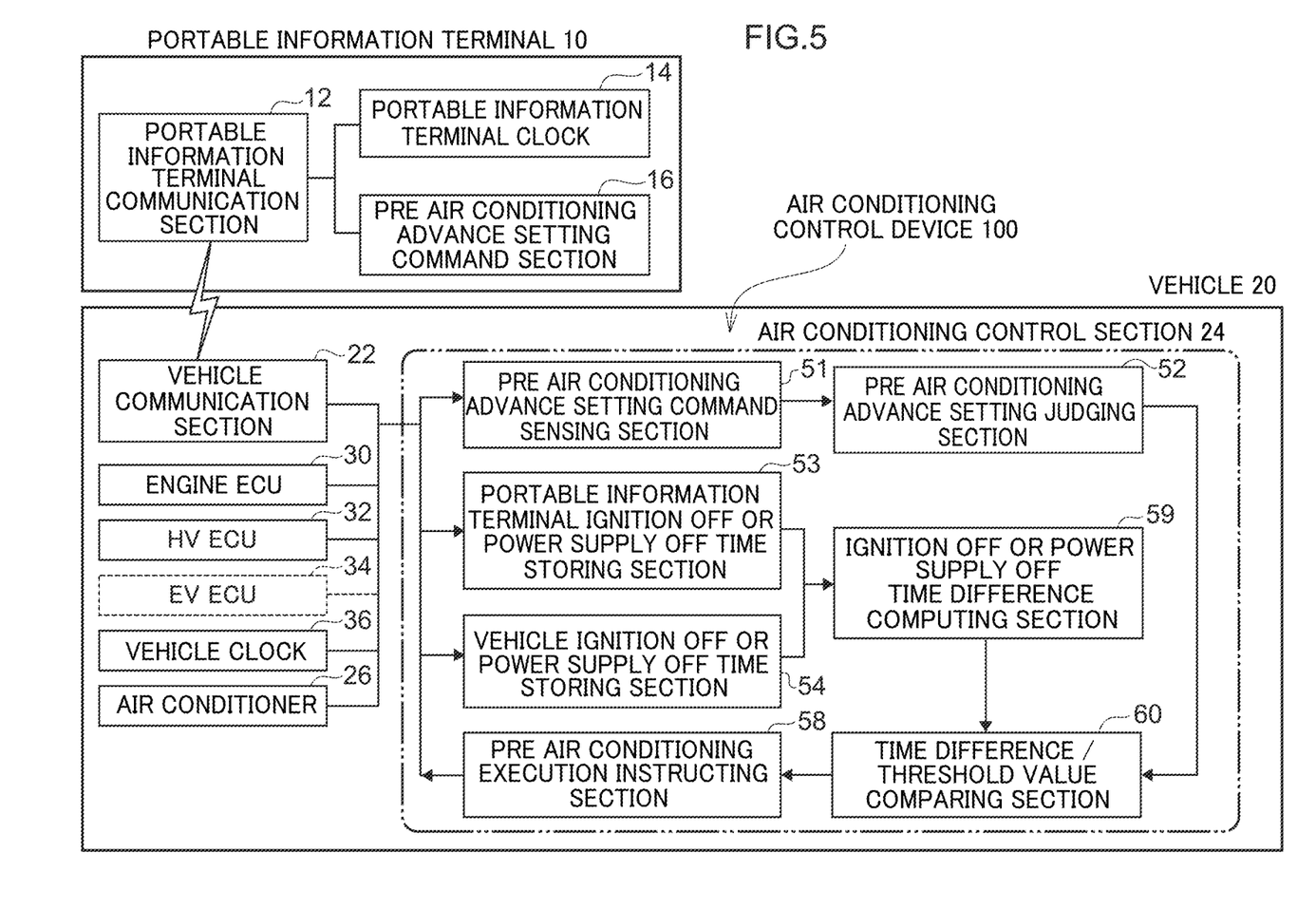
FIG. 5 is a block drawing showing the schematic structure of the air conditioning control device relating to a modified example of the embodiment of the present disclosure.

FIG. 5 is a block drawing showing the schematic structure of an air conditioning control device relating to a modified example of the present disclosure. Note that, in FIG. 5, structures that are the same as those in FIG. 4 are denoted by the same reference numerals, and description thereof is omitted. In FIG. 4, the current time of one of the portable information terminal 10 and the vehicle 20 is estimated in accordance with the above computational formulas from the portable information terminal ignition off or power supply off time that is stored in the portable information terminal ignition off or power supply off time storing section 53, and the vehicle ignition off or power supply off time that is stored in the vehicle ignition off or power supply off time storing section 54. However, FIG. 5 differs from FIG. 4 with regard to the point that pre-air-conditioning control is carried out on the basis of the time difference between the portable information terminal ignition off or power supply off time that is stored in the portable information terminal ignition off or power supply off time storing section 53, and the vehicle ignition off or power supply off time that is stored in the vehicle ignition off or power supply off time storing section 54, without estimating the current time of at least one of the portable information terminal 10 or the vehicle 20 from the portable information terminal ignition off or power supply off time that is stored in the portable information terminal ignition off or power supply off time storing section 53, and the vehicle ignition off or power supply off time that is stored in the vehicle ignition off or power supply off time storing section 54.

An ignition off or power supply off time difference computing section 59 computes the time difference between the portable information terminal ignition off or power supply off time that is stored in the portable information terminal ignition off or power supply off time storing section 53, and the vehicle ignition off or power supply off time that is stored in the vehicle ignition off or power supply off time storing section 54.

A time difference/threshold value comparing section 60 compares the time difference that was computed by the ignition off or power supply off time difference computing section 59 and a predetermined threshold value, and determines whether or not the time difference computed by the ignition off or power supply off time difference computing section 59 is less than the predetermined threshold value. The threshold value is, as an example, around 30 minutes to 2 hours. In a case in which the results of comparison by the time difference/threshold value comparing section 60 are that the time difference computed by the ignition off or power supply off time difference computing section 59 is less than the predetermined threshold value, the pre-air-conditioning execution instructing section 58 instructs the air conditioner 26 to carry out pre-air-conditioning as per the pre-air-conditioning advance setting.

In a case in which the results of comparison by the time difference/threshold value comparing section 60 are that the time difference computed by the ignition off or power supply off time difference computing section 59 is greater than or equal to the predetermined threshold value, the pre-air-conditioning execution instructing section 58 does not instruct the air conditioner 26 to execute pre-air-conditioning.

Although FIG. 5 illustrates an embodiment in which the vehicle 20 includes the air conditioning control section 24, there may be an embodiment in which the portable information terminal 10 includes the air conditioning control section 24.

Figure 6:
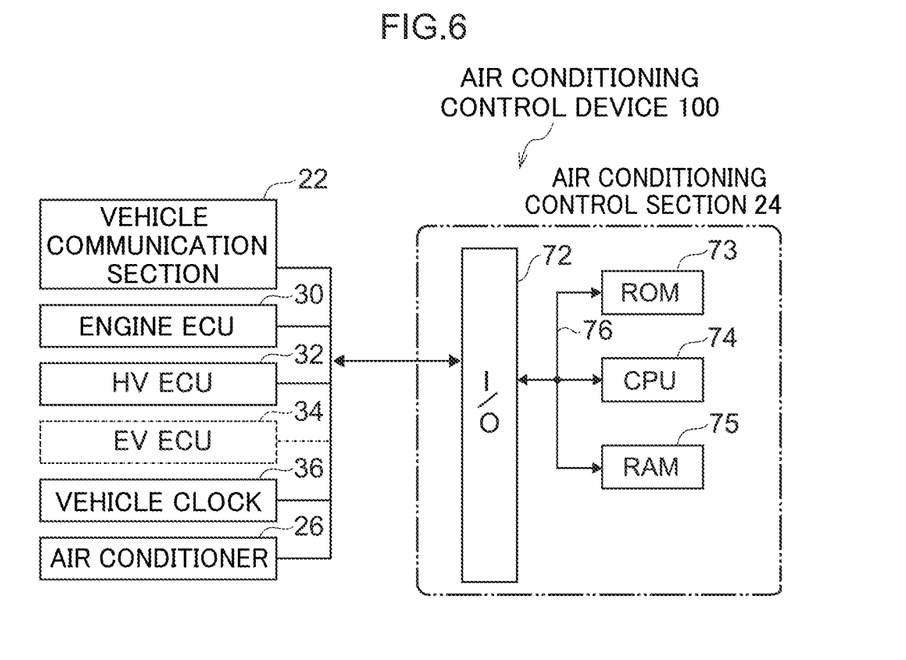
FIG. 6 is a block drawing showing the concrete structure of the air conditioning control device relating to a modified example of an embodiment of the present disclosure.

The air conditioning control device 100 relating to the embodiment of the present disclosure is described in further detail hereinafter. FIG. 6 is a block drawing showing the concrete structure of the air conditioning control device 100 relating to the embodiment of the present disclosure. Note that structures that are similar to those of FIG. 1, FIG. 4 and FIG. 5 are denoted by the same reference numerals.

The air conditioning control section 24 can be structured concretely by a computer in which a CPU 74, a ROM 73, a RAM 75 and an I/O (input/output interface) 72 are connected to a bus 76.

A program for instructing execution of pre-air-conditioning control of the air conditioner 26, and the like, are stored in the ROM 73. Due to the program that is stored in the ROM 73, which serves as a memory, being expanded in the RAM 75 and being executed by the CPU 74 that serves as a processor, the air conditioner 26 is made to execute pre-air-conditioning control.

The vehicle communication section 22, the engine ECU 30, the HVECU 32, the vehicle clock 36, and, when needed, the EVECU 34, the air conditioner 26, and the air conditioning control section 24 that controls the air conditioner 26, are connected to the I/O 72.

Although FIG. 6 illustrates an embodiment in which the air conditioning control section 24 is included in the vehicle 20, the air conditioning control section 24 may be included in the portable information terminal 10.

Further, the processings that are executed at the air conditioning control device 100 in the respective embodiments have been described as software processings that are carried out by programs being executed. However, the present disclosure is not limited to this, and these processings may be processings that are carried out by hardware, or processings that are carried out by a combination of software and hardware. In the case of processing by software, the program may be stored and distributed on any of various types of non-transitory storage media, such as a DVD (Digital Versatile Disc) or the like, and cause a processor such as the CPU 74 or the like to execute processing.

As described above, in accordance with the air conditioning control device 100 relating to the embodiments of the present disclosure, an instruction to execute pre-air-conditioning control of the air conditioner is carried out on the basis of the off time sensed at the vehicle and the off time acquired by the communication of the portable information terminal with the vehicle. Due thereto, erroneous operation of the air conditioner can be prevented in a case in which the clock of the portable information terminal and the clock of the vehicle are apart by a predetermined amount or more.

The present disclosure is not limited to the above-described embodiments and, in addition to the above-described embodiments, can of course be implemented by being modified in various forms within a scope that does not depart from the gist thereof

What is claimed is:

1. An air conditioning control device, comprising:
    a memory; and
    a processor,
    wherein the processor is configured so as to sense a turning off of an ignition or a power supply of a vehicle, to store a time of the turning off that is sensed at the vehicle, to store a time of the turning off that is acquired by communication of a portable information terminal with the vehicle, to sense an advance setting command for pre-air-conditioning that operates an air conditioner of the vehicle, to determine absence or presence of the advance setting command, and, in a case in which it is determined that the advance setting command is present, to instruct execution of pre-air-conditioning control of the air conditioner on the basis of the time of the turning off that is sensed at the vehicle and the time of the turning off that is acquired by communication of the portable information terminal with the vehicle.

2. The air conditioning control device of claim 1, wherein the processor is configured so as to estimate a current time of one of the portable information terminal or the vehicle from the time of the turning off that was sensed at the vehicle and the time of the turning off that was acquired by the communication of the portable information terminal with the vehicle, to compute a time difference between the current time and a current time of the other of the portable information terminal or the vehicle, and to instruct execution of pre-air-conditioning control of the air conditioner on the basis of a comparison between the computed time difference and a predetermined threshold value.

3. The air conditioning control device of claim 1, wherein the processor is configured so as to compute a time difference between the time of the turning off that was sensed at the vehicle and the time of the turning off that was acquired by the communication of the portable information terminal with the vehicle, and to instruct execution of pre-air-conditioning control of the air conditioner on the basis of a comparison between the time difference and a predetermined threshold value.

4. An air conditioning control method, comprising, by a processor:
    sensing a turning off of an ignition or a power supply of a vehicle;
    storing a time of the turning off that is sensed at the vehicle;
    storing a time of the turning off that is acquired by communication of a portable information terminal with the vehicle;
    sensing an advance setting command for pre-air-conditioning that operates an air conditioner of the vehicle;
    determining absence or presence of the advance setting command; and
    in a case in which it is determined that the advance setting command is present, instructing execution of pre-air-conditioning control of the air conditioner on the basis of the time of the turning off that is sensed at the vehicle and the time of the turning off that is acquired by the communication of the portable information terminal with the vehicle.

5. The air conditioning control method of claim 4, further comprising, by the processor:
    estimating a current time of one of the portable information terminal or the vehicle from the time of the turning off that was sensed at the vehicle and the time of the turning off that was acquired by the communication of the portable information terminal with the vehicle;
    computing a time difference between the current time and a current time of the other of the portable information terminal or the vehicle is computed; and
    instructing execution of pre-air-conditioning control of the air conditioner on the basis of a comparison between the computed time difference and a predetermined threshold value.

6. The air conditioning control method of claim 4, further comprising, by a processor
    computing a time difference between the time of the turning off that was sensed at the vehicle and the time of the turning off that was acquired by the communication of the portable information terminal with the vehicle; and
    instructing execution of pre-air-conditioning control of the air conditioner on the basis of a comparison between the time difference and a predetermined threshold value.

7. A non-transitory storage medium that stores a program for causing a processor to execute air conditioning control processing, comprising:
    sensing a turning off of an ignition or a power supply of a vehicle;
    storing a time of the turning off that was sensed at the vehicle;
    storing a time of the turning off that was acquired by communication of a portable information terminal with the vehicle;
    sensing an advance setting command for pre-air-conditioning that operates an air conditioner of the vehicle;
    determining absence or presence of the advance setting command; and
    in a case in which it is determined that the advance setting command is present, instructing execution of pre-air-conditioning control of the air conditioner on the basis of the time of the turning off that is sensed at the vehicle and the time of the turning off that is acquired by the communication of the portable information terminal with the vehicle.

8. The non-transitory storage medium of claim 7, wherein the air conditioning control processing further comprises:
- estimating a current time of one of the portable information terminal or the vehicle from the time of the turning off that was sensed at the vehicle and the time of the turning off that was acquired by the communication of the portable information terminal with the vehicle;
- computing a time difference between the current time and a current time of the other of the portable information terminal or the vehicle is computed; and
- instructing execution of pre-air-conditioning control of the air conditioner on the basis of a comparison between the computed time difference and a predetermined threshold value.

9. The non-transitory storage medium of claim 7, wherein the air conditioning control processing further comprises:
- computing a time difference between the time of the turning off that was sensed at the vehicle and the time of the turning off that was acquired by the communication of the portable information terminal with the vehicle; and
- instructing execution of pre-air-conditioning control of the air conditioner on the basis of a comparison between the time difference and a predetermined threshold value.

* * * * *